United States Patent
Deutsch et al.

(10) Patent No.: US 12,500,467 B2
(45) Date of Patent: Dec. 16, 2025

(54) SURFACE INSULATING MATERIAL OF A DYNAMOELECTRICAL MACHINE

(71) Applicant: Flender GmbH, Bocholt (DE)

(72) Inventors: Artur Deutsch, Bad Griesbach i. Rottal (DE); Norbert Schönbauer, Bad Füssing (DE); Michael Weger, Kösslarn (DE)

(73) Assignee: Flender GmbH, Bocholt (DE)

( * ) Notice: Subject to any disclaimer, the term of this patent is extended or adjusted under 35 U.S.C. 154(b) by 258 days.

(21) Appl. No.: 17/925,233

(22) PCT Filed: May 17, 2021

(86) PCT No.: PCT/EP2021/062980
§ 371 (c)(1),
(2) Date: Nov. 14, 2022

(87) PCT Pub. No.: WO2021/229099
PCT Pub. Date: Nov. 18, 2021

(65) Prior Publication Data
US 2023/0353002 A1    Nov. 2, 2023

(30) Foreign Application Priority Data
May 15, 2020 (EP) .................................. 20174999

(51) Int. Cl.
*H02K 3/32* (2006.01)
*F03D 9/25* (2016.01)
(Continued)

(52) U.S. Cl.
CPC ............ *H02K 3/345* (2013.01); *F03D 9/25* (2016.05); *F05D 2220/76* (2013.01); *H02K 7/183* (2013.01)

(58) Field of Classification Search
CPC .......... H02K 3/32; H02K 7/183; H02K 3/345; H02K 3/40; H02K 3/34; F05D 2220/76; F03D 9/25; H01B 7/0225
(Continued)

(56) References Cited

U.S. PATENT DOCUMENTS 3,775,628 A * 11/1973 Andersson ............... H02K 3/32
174/120 SR
4,327,246 A * 4/1982 Kincaid ............. H01B 11/1025
174/105 R
(Continued)

FOREIGN PATENT DOCUMENTS

DE       102 27 559      10/2003
GB       1 389 719       4/1975
(Continued)

OTHER PUBLICATIONS

English machine translation JP2851748 (Year: 1999).*
International Search Report issued by the European Patent Office in International Application PCT/EP2021/062980 on Jul. 27, 2021.

*Primary Examiner* — Burton S Mullins
(74) *Attorney, Agent, or Firm* — Henry M. Feiereisen LLC

(57) ABSTRACT

A surface insulating material includes three or more individual layers that are stacked on top of one another. The surface insulating material has a longitudinal extent, a transverse extent and a radial extent, in such a way that the individual layers have different dimensions at least in the transverse extent.

15 Claims, 4 Drawing Sheets

(51) Int. Cl.
*H02K 3/34* (2006.01)
*H02K 7/18* (2006.01)

(58) Field of Classification Search
USPC ....... 174/117 F, 120 R, 149 B, 150, DIG. 15, 174/DIG. 19–DIG. 20, DIG. 22, 174/DIG. 26–DIG. 30
See application file for complete search history.

(56) References Cited

U.S. PATENT DOCUMENTS

| | | | | |
|---|---|---|---|---|
| 4,533,580 | A * | 8/1985 | Otty | B32B 37/04 428/36.1 |
| 7,015,396 | B2 * | 3/2006 | Wada | H02K 3/345 174/110 N |
| 7,132,028 | B1 * | 11/2006 | Wahlers-Schmidlin | H02G 11/00 156/185 |
| 10,424,985 | B2 * | 9/2019 | Grübel | H02K 15/12 |
| 10,432,053 | B2 * | 10/2019 | Tamura | H02K 3/34 |
| 10,510,464 | B1 * | 12/2019 | Gronowski | H02K 3/12 |
| 10,897,173 | B2 * | 1/2021 | Yamaguchi | H02K 3/345 |
| 11,190,074 | B2 * | 11/2021 | Yamaguchi | H02K 15/10 |
| 11,374,454 | B2 * | 6/2022 | Kasai | H02K 3/34 |
| 11,387,701 | B2 * | 7/2022 | Yoshitake | H02K 3/345 |
| 2003/0008102 | A1 * | 1/2003 | Berl | H02K 3/345 428/119 |
| 2018/0205300 | A1 * | 7/2018 | Okada | H01B 3/52 |
| 2019/0206590 | A1 | 7/2019 | Yamoto et al. | |
| 2019/0318843 | A1 * | 10/2019 | Oliver | B32B 3/06 |

FOREIGN PATENT DOCUMENTS

| | | | |
|---|---|---|---|
| JP | S56-125945 | 10/1981 | |
| JP | 2851748 B2 * | 11/1998 | ............ H02K 3/34 |
| JP | 2015076906 A * | 4/2015 | ............ H02K 3/34 |

* cited by examiner

SURFACE INSULATING MATERIAL OF A DYNAMOELECTRICAL MACHINE

CROSS-REFERENCES TO RELATED APPLICATIONS

This application is the U.S. National Stage of International Application No. PCT/EP2021/062980, filed May 17, 2021, which designated the United States and has been published as International Publication No. WO 2021/229099 A1 and which claims the priority of European Patent Application, Serial No. 20174999.1, filed May 15, 2020, pursuant to 35 U.S.C. 119 (a)-(d).

BACKGROUND OF THE INVENTION

The invention relates to a surface insulating material of a dynamoelectrical machine, to an electrical conductor or a pre-formed coil comprising a surface insulating material of this kind, and to a dynamoelectrical machine which is provided with a conductor or pre-formed coil of this kind.

For their electrical conductors, which are arranged in slots of a magnetically conductive material, dynamoelectrical machines require, amongst other things, an insulation of the live components with respect to the magnetic-field-conducting bodies. These insulating materials, however, reduce the active conductor portion in a slot, in particular in the region of the slot opening, which reduces the efficiency of the dynamoelectrical machine.

Proceeding from this, the object of the invention is to create an insulation of conductors and/or pre-formed coils which increases comparatively the proportion of the active material of the slot, that is to say the conductor material in the slot of a dynamoelectrical machine, in particular a high-voltage machine. Furthermore, a dynamoelectrical machine is to be provided which has a comparatively higher efficiency.

SUMMARY OF THE INVENTION

The stated object is achieved by a surface insulating material which has three or more layers that are stacked on top of one another, and which has a longitudinal extent, a transverse extent and a radial extent, in such a way that the individual layers have different dimensions at least in the transverse extent.

The stated object is also achieved by an electrical conductor or a pre-formed coil of a dynamoelectrical machine,
  wherein the conductor in particular has two opposite narrow sides and two opposite longitudinal sides,
  wherein, at least in the portion of the electrical conductor or the pre-formed coil that is arranged in a slot of the dynamoelectrical machine, a surface insulating material according to the invention is wrapped around the portion in such a way that an overlap is present on the narrow side of the conductor pointing towards a slot opening,
  wherein the radial thickness of the overlap is smaller than the sum of the surface insulating materials lying radially one above the other on this narrow side.

The stated object is also achieved by a dynamoelectrical machine comprising a conductor or pre-formed coil according to the invention.

The surface insulating material according to the invention has a longitudinal extent corresponding substantially to the axial length of the slot. The longitudinal extent will be axially slightly longer in order to avoid any potential electrically parasitic edge effects at the end face of the magnetically conductive body, for example of the laminated core of stator and/or rotor.

The individual layers of the surface insulating material according to the invention have different transverse extents in order to ensure an overlap according to the invention. The transverse extent is determined substantially on the basis of the dimensions of the slot, that is to say the slot walls, the slot bottom, and the side of the slot opposite the slot bottom, that is to say in the region of the slot opening. The transverse extent is also determined substantially on the basis of the dimensions of the conductor or pre-formed coil, that is to say the sum of the two longitudinal sides, a narrow side and a layer-dependent overlap extent.

The surface insulating material according to the invention has a radial extent corresponding to the overall thickness of the surface insulating material. This is the case except for in the region of the slot opening, that is to say a narrow side of the conductor where the overlap according to the invention occurs, in order to avoid a double overall thickness.

Due to the surface insulating material according to the invention, which in respect of its transverse extent has different widths of the individual layers, individual layers can now be spared when assembling this insulating material, at least around the active part of the conductor or around the active part of the pre-formed coil, on the narrow side of the conductor with the overlap of the surface insulating material according to the invention. This reduces the overall thickness of the insulating material there, that is to say in the region of the slot opening, so that the conductor material can be increased.

The active part of the conductor or active part of the pre-formed coil is the portion that is placed in a slot of the dynamoelectrical machine, that is to say in a stator or also in a rotor. Nevertheless, a sufficient creepage distance is ensured in the slot, in particular also in the region of the slot opening, by the use according to the invention of the surface insulating material.

The overlap according to the invention, which represents an interleaving of the individual layers of the surface insulating material on a narrow side of the conductor or the pre-formed coil in the region of the slot opening, leads amongst other things advantageously to a radial increase in the active conductor material in the slot, that is to say to an increase in the conductor filling factor or copper filling factor, and can thus contribute to the performance increase of the dynamoelectrical machine.

In accordance with the invention there is thus a predefinable gap in the middle layer in the region of the slot opening. In particular, the middle layer of the surface insulating material does not surround the conductor completely. This electrically important insulation layer is not necessary in the region of the slot opening—that is to say where a slot closure element is provided. Thus, no "counter electrode" in the form of the laminated core is provided.

This arrangement of the individual layers of the surface insulating material over a number of levels, in particular on the narrow side of the conductor or the pre-formed coil in the region of the slot opening, to form an interleaving pattern according to the invention, can be additionally optimized in particular by predefinable bending lines of the surface insulating material. The dimensions of the electrical conductor, in particular the cross section of the conductor, must preferably be predefined here in advance already at the time of production of the surface insulating material so that the bending lines correlate with the edges.

A winding system of a dynamoelectrical machine has electrically one or more electrical phases, for example L1, L2, L3. Each phase has one or more coils, which are connected electrically in series and/or in parallel. Each coil has one or more turns. Each turn is a conductor, the active portion of which is arranged in the slot. The other portions are arranged outside the slot and generally form a winding head of the dynamoelectrical machine. The conductor can also be constructed from different sub-conductors connected electrically in parallel. Insulation of the sub-conductors is intended to avoid substantial skin effects amongst them.

The surface insulating material in this exemplary embodiment is constructed from three layers: an outer layer, a middle layer and an inner layer.

The outer layer and the inner layer are each constructed from an aramid paper, aramid film, polyester film, polyester nonwoven or aramid nonwoven, wherein aramid is a generic term for polyamides in which the aramid group is bound to aromatic groups. Polymers with ester function are understood to be polyesters.

The middle layer is decisive for the insulation between live conductors, for example made of copper, and the grounded magnetically conductive body, the laminated core. The material provided for this therefore also comprises a predefinable proportion of mica. A suitable material for the middle layer is aramid paper, aramid film, polyester film, polyester nonwoven or aramid nonwoven.

The material combination of the surface insulating material can be selected here depending on the intended application, working from the above-mentioned materials or comparable materials. The middle layer, however, preferably always comprises a mica component.

Due to the three-layered construction of the surface insulating material, a flexible and yet robust processability during the assembly of the winding system is provided. The surface insulating material forms a multiple laminate, the individual layers of which can also be fixed to one another by a binder. Adhesives that may optionally also comprise additives, such as hardeners, accelerators and fillers, in predefinable amounts are suitable for this purpose.

In conventional high-voltage machines (from 1 KV to 15 KV), overall thicknesses of the surface insulating material of from 0.6 mm to 2 mm, preferably 0.9 mm are to be provided. The individual layer thicknesses of the outer and inner layers range preferably between 0.3 and 0.4 mm. The middle layer is adapted accordingly.

Slot closure elements are provided advantageously in the region of the slot opening and assist a compacting of the overlap according to the invention.

This is achieved in that, in the region of the slot opening, one or more of the total number of layers are not arranged in abutment but with gaps. No reduction of the insulation strength occurs here, since the counter electrode of the live conductor there in the form of the normally grounded laminated core is "missing".

The invention is not reduced to a three-layer surface insulating material, rather the concept of the interleaved overlap according to the invention can be implemented also in two-layer, four-layer systems, etc. It is always key that, due to the interleaved overlap of the involved layers of the surface insulating material, there may be an increase of the active conductor material in the slot.

BRIEF DESCRIPTION OF THE DRAWING

The invention and advantageous embodiments of the invention will be explained in greater detail on the basis of exemplary embodiments shown in principle, in which.

DETAILED DESCRIPTION OF PREFERRED EMBODIMENTS

Figure 1:
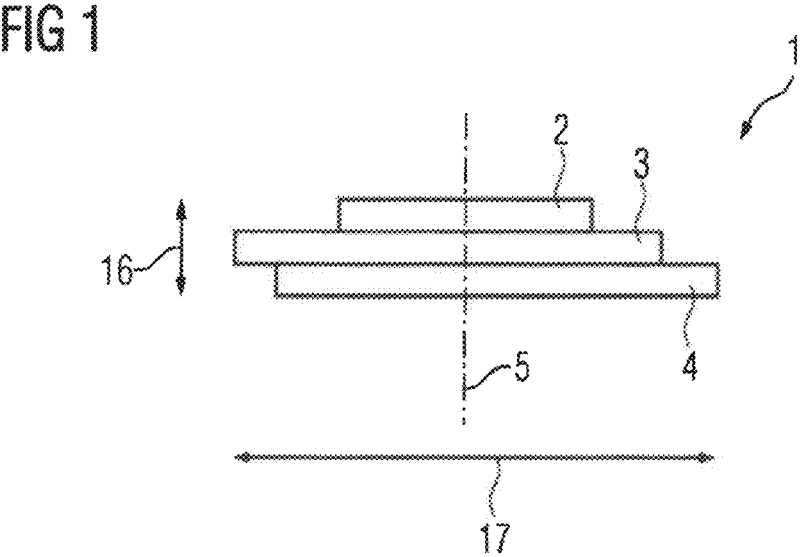
FIG. 1 shows a side view of a surface insulating material.

FIG. 1 shows a basic illustration of a surface insulating material 1 having three layers. An outer layer 2 (substantial contact with a slot wall 10/slot bottom 15 with exception of the region of the slot opening 14), a middle layer 3 (between outer layer 2 and inner layer 4) and an inner layer 4 (substantial contact with a conductor 6 with the exception of the region of the slot opening 4). These three layers have different transverse extents 17. These different transverse extents 17 can be arranged symmetrically about a reference line 5 or also asymmetrically. The three layers of the surface insulating material 1 are connected to one another in an integrally bonded manner, that is to say non-movably, in particular are adhesively bonded. Depending on the thermal requirements, different adhesives or binders can be used here.

The surface insulating material 1 has a longitudinal extent 18 corresponding substantially to the axial length of the slot 9. The longitudinal extent 18 is axially slightly longer in order to avoid any potential electrically parasitic edge effects at the end face of the magnetically conductive body, for example of the laminated core of stator and/or rotor.

The individual layers of the surface insulating material 1 according to the invention have different transverse extents 17 in order to ensure an overlap according to the invention. The transverse extent 17 is determined substantially on the basis of the dimensions of the slot 9, that is to say the slot walls 10, the slot bottom 15, and the side of the slot 9 opposite the slot bottom, that is to say in the region of the slot opening 14. The transverse extent 17 is given also substantially from the dimensions of the conductor 6 or pre-formed coil, that is to say the sum of the two longitudinal sides, a narrow side and a layer-dependent overlap extent in the region of the slot opening 14.

The surface insulating material 1 has a radial extent 16 corresponding to the overall thickness of the surface insulating material 1. This is the case apart from in the region of the slot opening 14, that is to say a narrow side of the conductor 6 where the overlap according to the invention occurs. A double overall thickness there is to be avoided by the interleaved overlap according to the invention.

The layers 2, 3, 4, depending on requirements, have different thicknesses and/or compositions. In particular, a predefinable amount of mica is added here to the middle layer 3.

Figure 2:
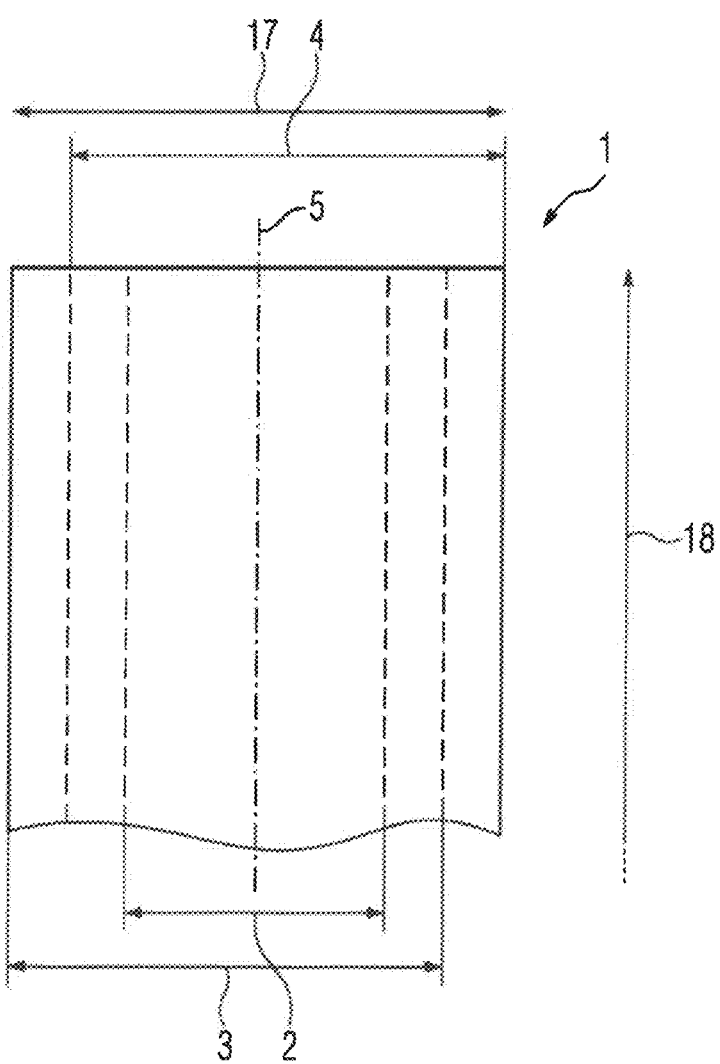
FIG. 2 shows a plan view of a surface insulating material.

FIG. 2 shows a plan view of the surface insulating material 1, wherein the transverse extent 17 of the individual layers 2, 3, 4 is shown by dashed lines.

FIG. 2 also shows, by way of example and optionally, bending lines 19 of the surface insulating material 1 at edges of the conductor 6. This simplifies the processing and leads to a further compacting of the insulation structure in the slot 9. These bending lines 19 of course must not result in any losses in the insulation strength, particularly at the edges of the conductor 6.

Figure 3:
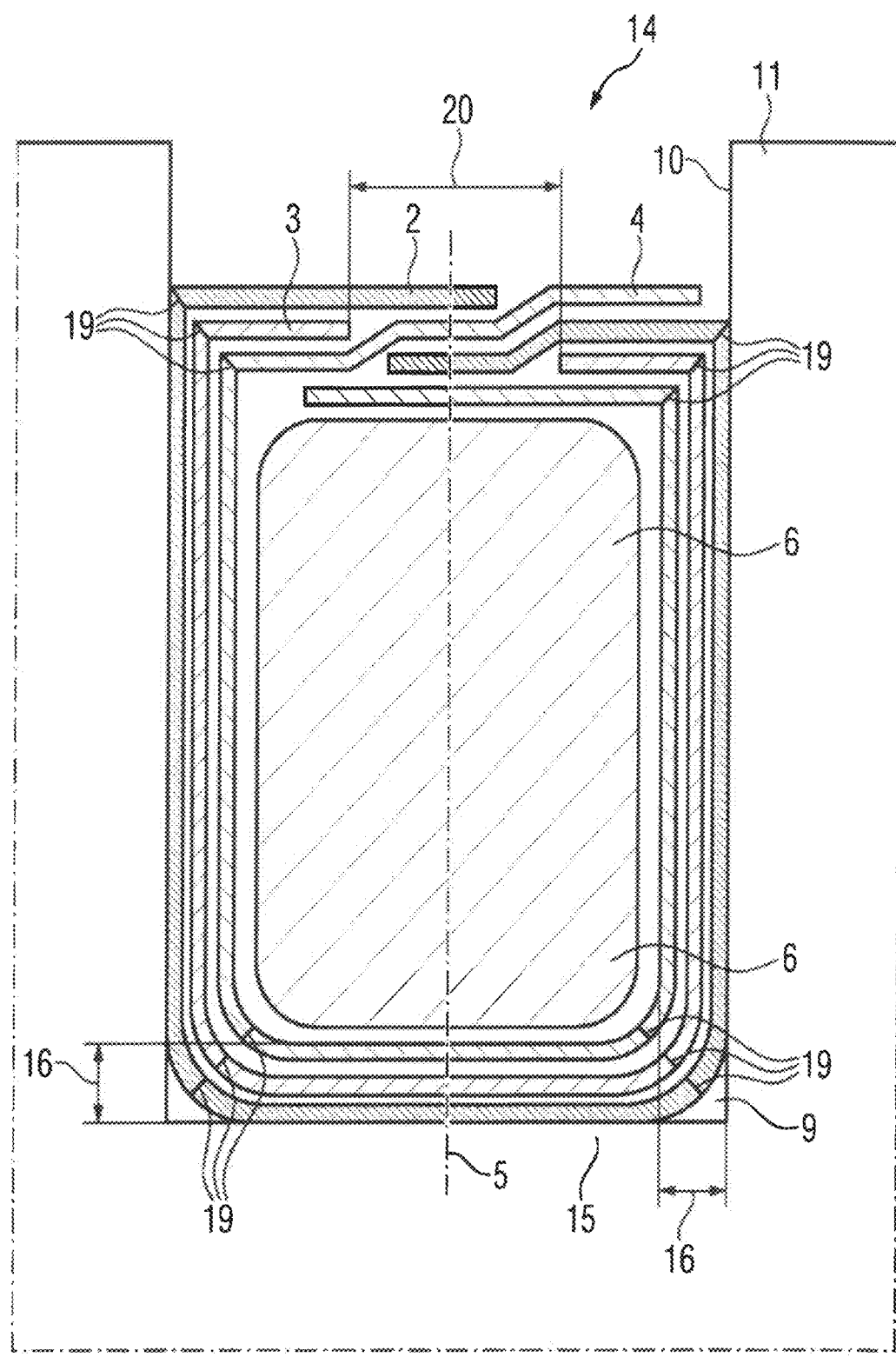
FIG. 3 shows a detail of a solid conductor with surface insulating material.

FIG. 3 shows a partial cross section of a conductor 6 which is solid. There too, the surface insulating material 1 can be used, as is also the case with a conductor 6 according to FIG. 4, which is provided there by way of example with different sub-conductors (round conductor, substantially square sub-conductor). These sub-conductors are insulated within the conductor 6.

Due to the different transverse extent 17 of the individual layers 2, 3, 4, the overlap in the region of the slot opening 14 can reduce the radial overall thickness of the surface insulating material 1 compared to conventional overlaps.

Figure 4:
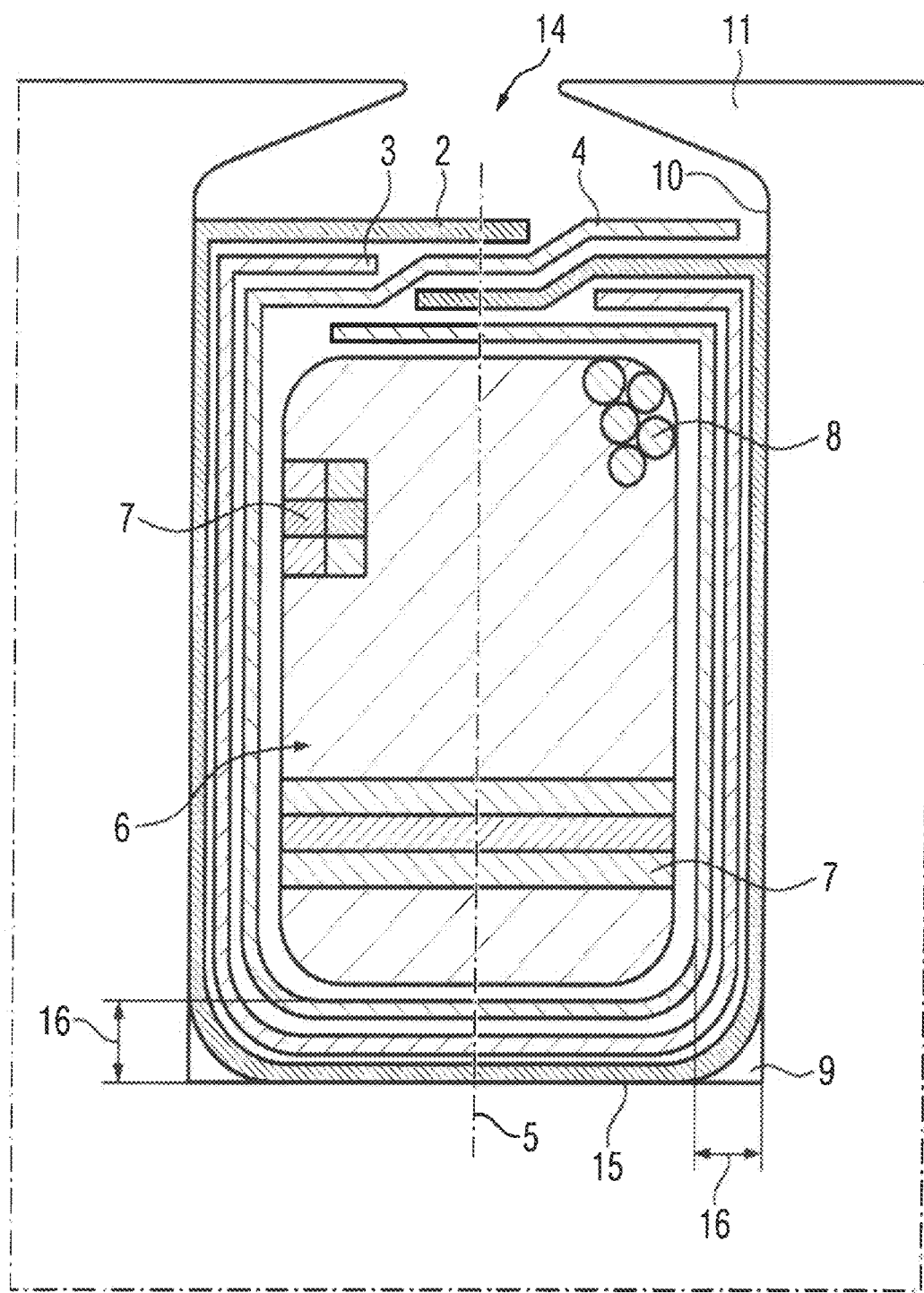
FIG. 4 shows a detail of a conductor formed from sub-conductor with surface insulating material.

In the shown embodiments according to FIG. 3 or FIG. 4, the inner layer 4 has the widest transverse extent 17. This is followed in the dimension of the transverse extent 17 by the outer layer 2. The middle layer 3 is dimensioned such that it does not fully surround the conductor 6. The remaining gap or space 20 between the two ends of the transverse extent of the middle layer 3 is occupied by the inner layer 4 and/or the outer layer 2.

What is key for the implementation of the invention is that the surface insulating material 1 is placed on the conductor 6 prior to radial or axial insertion into the slot 9, in such a way that the reference line 5 is placed against the conductor 6 in a predefined position. This placement against the conductor 6 is performed in particular in the middle on the side of the conductor 6 (for example narrow side), which is then placed within the slot 9 on the slot bottom 15 at a predetermined location on the slot bottom 15, preferably centrally.

The conductor 6 can thus be provided beforehand with the surface insulating material 1 and then inserted into the slot 9.

It is also possible to line the slot 9 first with the surface insulating material 1 and then to insert the conductor 6. Here, care should be taken to ensure that the surface insulating material 1 is placed in the slot 9 in a precisely located manner. For example, this ensured in that the reference line 5 of the surface insulating material 1 is arranged in the middle on the slot bottom 15.

Regardless of the above-described method for placement of the surface insulating material 1, it must be ensured that, if bending lines 19 are provided, these are placed in an accurately positioned manner at the edges of conductor 6 and/or in corners of the slot 9.

Slot closure elements (not shown in greater detail) are advantageously provided in the region of the slot opening 14 and, amongst other things, assist a compacting of the overlap of the surface insulating material 1 according to the invention.

This is achieved in that, in the region of the slot opening 14, one or more of the entire number of layers are not arranged in abutment, but with a gap 20. This does not result in a reduction of the insulation strength, since the counter electrode of the live conductor there in the form of the laminated core is "missing".

The layers 2, 3, 4 are shown in a basic and simplified manner in particular in FIGS. 3 and 4; there are no cavities or distances between the individual layers 2, 3, 4, nor between the inner layer 4 and the conductor 6.

A dynamoelectrical machine provided with a surface insulating material 1 of this kind has a stator and a rotor which each comprise a magnetically conductive body formed from axially layered laminations 11. The conductors 6, which have winding heads at the end face of stator and possibly rotor, comprise this surface insulation 1 in particular in the slots 9 of the magnetically conductive body. This surface insulation 1 extends in the normal case axially from the end face of the stator and/or rotor, also protruding over a predefinable distance in the direction of the winding head in order to achieve the necessary insulation strength.

A dynamoelectrical machine provided with such surface insulating material 1 is comparatively efficient, since with a comparable slot cross section the copper filling factor can be increased in accordance with the invention.

Figure 5:
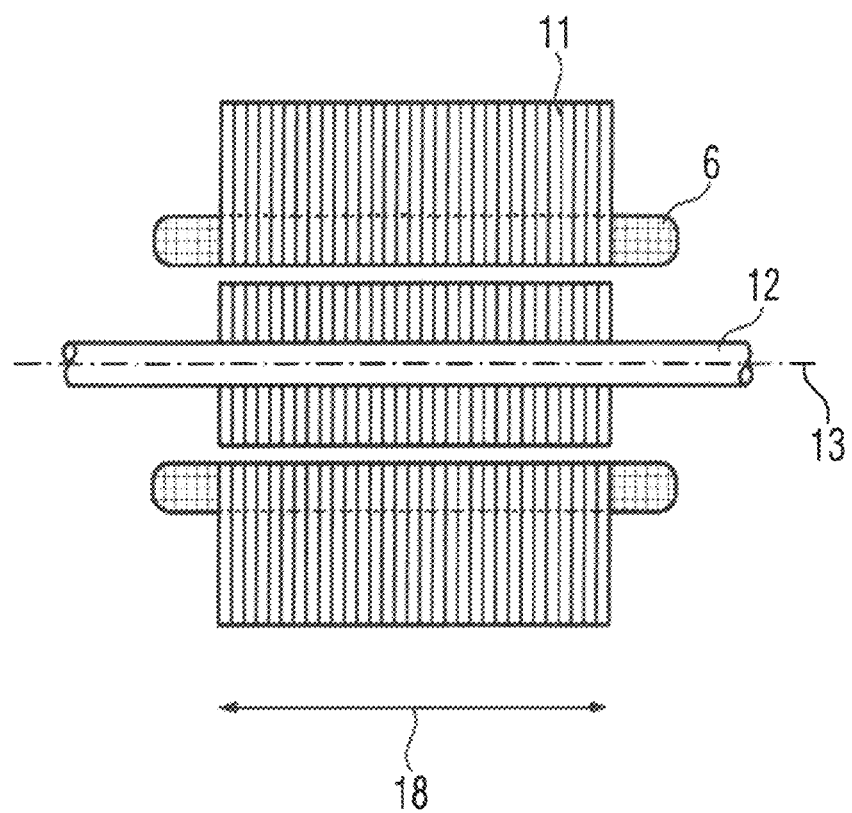
FIG. 5 shows a dynamoelectrical machine.

A dynamoelectrical machine according to FIG. 5 can be a motor or also a generator, in particular a wind turbine.

The slots 9 of the magnetically conductive body of the stator and/or rotor are half open or open. In other words, the slot opening 14 is narrower than the slot width or corresponds to the slot width.

The generator can also be constructed here in a segmented manner, considered in the circumferential direction.

The invention claimed is:

1. An electrical conductor or pre-formed coil of a dynamoelectrical machine, comprising:
   a surface insulating material comprising three or more Individual layers that are stacked on top of one another, and having a longitudinal extent, a transverse extent and a radial extent, in such a way that the individual layers have different dimensions at least in the transverse extent, said surface Insulating material provided in surrounding relation to at least one active portion of the electrical conductor or pre-formed coil, which active portion is arranged in a slot of the dynamoelectrical machine, with the surface insulating material wrapped at least around the active portion in such a way that two ends of one of the individual layers form a gap in the transverse extent of the one of the individual layers in a region of a slot opening and at least one of the other individual layers occupies the gap so that there is an overlap on a narrow side of the electrical conductor or pre-formed coil, which narrow side points towards the slot opening, said overlap defined by a radial thickness which is smaller than a sum of the stacked layers of the surface insulating material lying radially one above the other on the narrow side.

2. The electrical conductor or pre-formed coil of claim 1, wherein the individual layers of the surface insulating material are adhesively bonded to one another.

3. The electrical conductor or pre-formed coil of claim 1, wherein the individual layers of the surface insulating material are each arranged asymmetrically and differently with respect to a reference line.

4. The electrical conductor or pre-formed coil of claim 3, wherein the reference line of the surface insulating material is arranged on a slot bottom on a side facing away from the slot opening.

5. The electrical conductor or pre-formed coil of claim 4, wherein the reference line of the surface insulating material is arranged centrally on the slot bottom.

6. The electrical conductor or pre-formed coil of claim 1, wherein the surface insulating material comprises pre-defined bending lines running in the longitudinal extent.

7. The electrical conductor or pre-formed coil of claim 1, comprising two of said narrow sides in opposite relationship and two opposite longitudinal sides.

8. A dynamoelectrical machine, comprising an electrical conductor or pre-formed coil which comprises a surface insulating material comprising three or more individual layers that are stacked on top of one another, and having a longitudinal extent, a transverse extent and a radial extent, in such a way that the individual layers have different dimensions at least in the transverse extent, said surface insulating material provided in surrounding relation to at least one active portion of the electrical conductor or pre-formed coil, which active portion is arranged in a slot of the dynamoelectrical machine, with the surface insulating material wrapped at least around the active portion in such a way that two ends of one of the individual layers form a gap in the transverse extent of the one of the individual layers in a region of a slot opening and at least one of the other individual layers occupies the gap so that there is an overlap on a narrow side of the electrical conductor or pre-formed coil, which narrow side points towards the slot opening, said overlap defined by a radial thickness which is smaller than a sum of the stacked layers of the surface insulating material lying radially one above the other on the narrow side.

9. The dynamoelectrical machine of claim 8, wherein the electrical conductor or pre-formed coil includes two of said narrow sides in opposite relationship and two opposite longitudinal sides.

10. The dynamoelectrical machine of claim 8, wherein the individual layers of the surface insulating material are each arranged asymmetrically and differently with respect to a reference line.

11. The dynamoelectrical machine of claim 10, wherein the reference line of the surface insulating material is arranged on a slot bottom on a side facing away from the slot opening.

12. The dynamoelectrical machine of claim 11, wherein the reference line of the surface insulating material is arranged centrally on the slot bottom.

13. The dynamoelectrical machine of claim 8, wherein the individual layers of the surface insulating material are adhesively bonded to one another.

14. The dynamoelectrical machine of claim 8, wherein the surface insulating material comprises predefined bending lines running in the longitudinal extent.

15. A wind turbine, comprising the dynamoelectrical machine as set forth in claim 8.

* * * * *